Patented Jan. 1, 1946

2,392,156

UNITED STATES PATENT OFFICE 2,392,156

METHOD OF PREPARING DRY AMINO HETEROCYCLES

Victor L. King, Bound Brook, N. J., assignor to American Cyanamid Company, New York, N. Y., a corporation of Maine No Drawing. Application October 17, 1944, Serial No. 559,125

4 Claims. (Cl. 260—239.6)

This invention relates to an improved method of preparing intermediates for sulfa drugs.

Many sulfanilamide derivatives which have achieved great practical success, such as 2-sulfanilamido pyrimidine (sulfadiazine), 2-sulfanilamido-4-methyl-pyrimidine (sulfamerazine) and 2-sulfanilamido thiazole (sulfathiazole) are prepared by condensing acetylsulfanilylchloride with the corresponding aminopyrimidine or aminothiazole in the presence of a combined solvent and acid binding agent for which pyridine is extensively used. The $N^4$-acetylsulfanilamido compound is then hydrolyzed and produces the sulfa drug of commerce. The present invention relates to the preparation of the acetyl intermediate.

It has been found on the large scale that it is important that the acetylsulfanilylchloride be extremely dry. The presence of even small amounts of water very seriously affects the yield on the basis of amino heterocycle used. This has led to the practice of drying these amines, such as the 2-aminopyrimidine or 2-aminothiazole, which necessitated loading onto trays and drying for an hour or more, followed by micromilling to expose the interior still holding moisture, and a second drying operation at low temperatures. This procedure has resulted in added cost and unless great care is taken in the drying some batches still contain moisture and the yield then drops.

Many of the amino heterocycles, such as 2-aminopyrimidine, are toxic when handled and present hazards if they are handled or if they are reduced to dust. The additional handling and possible formation of some dust represents a further serious drawback to the practice of drying the compound on trays.

According to the present invention I have found that it is not necessary to dry the aminopyrimidine or aminothiazole itself provided it is added first to the pyridine and then a portion of the pyridine distilled off. This distillation of a portion of the pyridine has been found to completely dry the amine and without any further manipulation the acetylsulfanilylchloride can be added and high yields of the corresponding acetylsulfanilamido compound obtained. The pyridine distilled over carries with it all of the moisture and presents no recovery problem because the pyridine which is used in the reaction itself has to be treated to a break-up of pyridine hydrochloride produced in the reaction and this treatment normally introduces some moisture, so that the pyridine has to be dried in any event. The pyridine which is distilled over in the present invention is merely mixed with the pyridine to be recovered and both are dried together.

The present invention maintains uniformly high yields without the expensive and time consuming drying and milling which was formerly considered necessary, and which is replaced by an extremely cheap distillation of some pyridine and its drying, and notable economies are obtainable. In many chemical processes improved yields and reliability are often obtained at the price of increased operating costs. In the present case the improved yields and reliability are obtained with markedly lowered operating costs, so that the present invention belongs to the desirable class of reaction where improved results are obtained at lower cost instead of higher.

The present invention is useful in the production of acetylsulfanilamido compounds generally where the reaction is effected in the presence of a liquid base, such as a tar base, and is not limited to the production of sulfanilamido pyrimidines and thiazoles, although these products represent the field in which the present invention provides the greatest economical advantage.

In practical operation it may not always be necessary to use pure pyridine, and sometimes a tar base fraction containing a major portion of pyridine may be employed. Such a fraction is often referred to loosely in the trade as pyridine. Throughout the present specifications and claims the term pyridine is used in this loose sense to cover in addition to pure pyridine also a tar base fraction which contains a major portion of pyridine, and is not intended to be limited to pure pyridine alone. It is an advantage of the present process that it is usable with the cheap technical tar base fraction which is normally used.

The invention will be described in greater detail in conjunction with the following specific examples. The parts are by weight.

Example 1

600 parts of pyridine are charged into a reaction vessel provided with a packed distillation column, the pyridine containing about ½% of water. 100 parts of moist 2-aminopyrimidine cake containing 9.6 parts of water are added. The pyridine is slowly distilled through the column until the distillation temperature reaches 115.5° C. About 300 parts of the pyridine is distilled over, carrying with it 12.39 parts of water. Most of the water comes over with the first 100 parts of pyridine, the last 200 parts containing only 2.13 parts of water and thus being suitable for use with the next batch without drying. The distillation removes 96.7% of the water present.

The distillation residue is then condensed with acetylsulfanilylchloride by introducing the latter gradually in the conventional manner. If desired the same reaction vessel may be used. The condensation proceeds to completion and a high yield of $N^4$-acetyl-2-sulfanilamido pyrimidine is obtained.

Example 2

620 parts of pyridine containing 18% water are charged into a reaction vessel as described in Example 1, and 128 parts of 2-amino-4-methylpyrimidine containing about 10 parts of water are added. Heat is applied and the pyridine is distilled through the column until the temperature reaches 115.3° C. A total of 300 parts of distillate is produced which contains practically all of the water. The distillation residue is then condensed with acetylsulfanilylchloride in the conventional manner and a high yield of the $N^4$-acetyl-2-sulfanilamido-4-methylpyrimidine is obtained. As in Example 1 most of the water comes over with the first third of the pyridine and the last 200 parts distilled contain a sufficiently small amount of water so that they can be used in the next run without drying.

Example 3

In a container equipped with a stirrer and a column set for distillation was placed 282.5 parts of dry pyridine and 76.8 parts of wet aminothiazole containing 62.5 parts of real aminothiazole. The mixture was heated and distilled through the column until 150 parts of distillate had been collected. The per cent of water in the distillate had dropped to 0.38% and the distillation was stopped.

The heel was cooled and the now dry aminothiazole it contained was condensed in the usual manner with 161.5 parts of acetylsulfanilylchloride to give 161.9 parts of dry $N^4$-acetylsulfanilaminothiazole. This corresponds to a high theoretical yield.

I claim:

1. A method of producing a $N^4$-acetylsulfanilamido compounds which comprises mixing the undried corresponding amine with pyridine, distilling off a portion of the pyridine until the major portion of water is removed, and condensing the remaining mixture of pyridine and amine with acetylsulfanilylchloride.

2. A method of preparing $N^4$-acetyl-2-sulfanilamidopyrimidine which comprises mixing moist 2-aminopyrimidine with pyridine, distilling off a portion of the pyridine until the major portion of moisture has been removed, and condensing the remaining mixture of pyridine and 2-aminopyrimidine with acetylsulfanilylchloride.

3. A method of producing $N^4$-acetyl-2-sulfanilamido-4-methylpyrimidine which comprises mixing moist 2-amino-4-methylpyrimidine with pyridine, distilling off a portion of the pyridine until the major portion of the water has been removed, and condensing the remaining mixture of pyridine and 2-amino-4-methylpyrimidine with acetylsulfanilylchloride.

4. A method of producing $N^4$-acetylsulfanilamidothiazole which comprises mixing moist 2-aminothiazole with pyridine, distilling off a portion of the pyridine until the major portion of water is removed, and condensing the remaining mixture of pyridine and aminothiazole with acetylsulfanilylchloride.

VICTOR L. KING.